United States Patent
Hoban, Jr. et al.

(10) Patent No.: US 9,541,022 B2
(45) Date of Patent: Jan. 10, 2017

(54) ELECTRONIC CONTROL MODULE WITH DRIVER BANKS FOR ENGINES

(71) Applicant: Caterpillar Inc., Peoria, IL (US)

(72) Inventors: William E. Hoban, Jr., Dunlap, IL (US); Ioan Paduret, Peoria, IL (US); James D. Siegle, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 438 days.

(21) Appl. No.: 14/263,051

(22) Filed: Apr. 28, 2014

(65) Prior Publication Data
US 2015/0308399 A1    Oct. 29, 2015

(51) Int. Cl.
| | |
|---|---|
| *F02M 51/00* | (2006.01) |
| *F02D 41/20* | (2006.01) |
| *F02D 41/28* | (2006.01) |
| *F02P 5/15* | (2006.01) |
| *F02P 3/02* | (2006.01) |
| *F02P 5/04* | (2006.01) |

(52) U.S. Cl.
CPC .............. *F02D 41/20* (2013.01); *F02D 41/28* (2013.01); *F02P 5/1502* (2013.01); *F02D 2041/2003* (2013.01); *F02D 2041/2082* (2013.01); *F02P 3/02* (2013.01); *F02P 5/045* (2013.01); *Y02T 10/46* (2013.01)

(58) Field of Classification Search
CPC .. F02D 41/20; F02D 41/28; F02D 2041/2003; F02D 2041/2082; F02P 5/1502; F02P 5/045; F02P 3/02
USPC .............. 123/406.65, 406.66, 406.6, 406.12, 123/406.2; 701/101, 102, 103
See application file for complete search history.

(56) References Cited

U.S. PATENT DOCUMENTS

| | | | |
|---|---|---|---|
| 4,020,802 A | | 5/1977 | Hattori et al. |
| RE34,183 E | * | 2/1993 | Wilens ................. F02P 3/0456 123/406.19 |
| 5,469,825 A | * | 11/1995 | Golab ..................... F02D 41/20 123/479 |
| 5,642,253 A | * | 6/1997 | Shreve ................. F02P 3/0435 361/152 |
| 6,100,728 A | * | 8/2000 | Shreve ............... H03K 17/0826 327/110 |
| 6,371,077 B1 | | 4/2002 | McGee |

(Continued)

FOREIGN PATENT DOCUMENTS

| | | |
|---|---|---|
| JP | 2009174492 | 8/2009 |
| JP | 2012184686 | 9/2012 |

*Primary Examiner* — Thomas Moulis
(74) *Attorney, Agent, or Firm* — Baker & Hostetler LLP; Thomson Reuters

(57) ABSTRACT

An engine control module (ECM) having a plurality of driver banks is provided. Each of the driver banks is configured to drive a plurality of combustion control elements. The driver banks include two low side driver circuits and a high side driver circuit, the high side driver circuit in each of the plurality of driver banks being shared pairwise by two combustion control elements. Each one of said at least two low side driver circuits is respectively associated with the two combustion control elements. The ECM includes a field programmable gate array (FPGA) coupled to the plurality of driver banks and configured to provide firing signals to at least twelve high side driver circuits to simultaneously drive at least twelve combustion control elements respectively coupled to the at least twelve high side driver circuits.

20 Claims, 8 Drawing Sheets

(56) References Cited

U.S. PATENT DOCUMENTS

| | | | |
|---|---|---|---|
| 6,516,658 B1* | 2/2003 | McCoy | F02D 41/20 73/114.45 |
| 7,591,258 B2 | 9/2009 | Nagel et al. | |
| 8,336,521 B2 | 12/2012 | Tripathi et al. | |
| 8,782,578 B2* | 7/2014 | Tell | G06F 1/10 716/101 |
| 9,050,981 B2* | 6/2015 | Vernacchia | B60W 50/02 |
| 2004/0007222 A1* | 1/2004 | Skinner | F02P 3/02 123/609 |
| 2005/0066940 A1* | 3/2005 | Sheikh | F02D 41/20 123/446 |
| 2005/0073279 A1* | 4/2005 | Fenley | B60K 6/26 318/717 |
| 2005/0225265 A1* | 10/2005 | Ribarich | H05B 41/28 315/291 |
| 2006/0207564 A1 | 9/2006 | Kinose | |
| 2007/0067092 A1* | 3/2007 | Burkatovsky | G05B 19/0425 701/114 |
| 2007/0262656 A1 | 11/2007 | Fulks et al. | |
| 2007/0273412 A1* | 11/2007 | Yoshida | G09G 3/296 327/108 |
| 2009/0229570 A1* | 9/2009 | Ulrey | F02D 41/20 123/431 |
| 2010/0269793 A1 | 10/2010 | Wang et al. | |
| 2014/0011463 A1* | 1/2014 | Madan | H04B 1/44 455/78 |
| 2014/0121945 A1* | 5/2014 | Viele | F02D 41/20 701/103 |
| 2014/0121946 A1* | 5/2014 | Viele | F02D 41/20 701/103 |
| 2015/0188328 A1* | 7/2015 | Abouda | H03K 17/063 123/478 |
| 2015/0192178 A1* | 7/2015 | Leteinturier | F02D 41/30 701/67 |
| 2015/0326123 A1* | 11/2015 | Fukushima | H02M 3/158 323/271 |

* cited by examiner

ELECTRONIC CONTROL MODULE WITH DRIVER BANKS FOR ENGINES

TECHNICAL FIELD

This patent disclosure relates generally to electronic control modules for an engine, and more particularly, to an electronic control module with a driver bank.

BACKGROUND

Conventional large engine electronic control modules (ECMs) are scaled up versions of medium engine controls, and have functional and environmental limitations when used with modern large engine fuel systems/ignition systems. Some conventional solutions have flexibility in terms of the waveforms they can generate, but are thermally inefficient, and do not allow multiple simultaneous waveforms on different injectors/ignition coils. Other conventional solutions provide more efficient drivers, but lack flexibility with respect to the waveforms that can be generated, and are incompatible with ignition waveforms, and potentially new injector waveforms. For example, one such waveform transitioning method and apparatus is disclosed in U.S. Pat. No. 6,371,077 that provides transitioning from one waveform to another at a time.

Some conventional solutions include Application Specific Integrated Circuits (ASICs) to control output waveforms and the fuel system of a vehicle. However, such ASIC based solutions do not have flexibility of commanding or controlling waveforms for gas engines, and lack customized diagnostics or monitoring of various engine parameters. Further, such ASIC based solutions are not backward compatible in terms of accurately replicating various waveforms associated with previous generations of ECMs.

Furthermore, the drivers implemented in conventional ECMs utilize blocking diodes that reduce thermal efficiency and have limited window of engine crank angles in which they can operate or fire.

SUMMARY

In one aspect, an engine control module (ECM) is provided. The ECM includes a plurality of driver banks configured to drive a plurality of combustion control elements. Each of the plurality of driver banks includes two low side driver circuits and a high side driver circuit. The high side driver circuit in each of the plurality of driver banks is shared pairwise by two combustion control elements in the plurality of combustion control elements, and each one of said at least two low side driver circuits is respectively associated with the two combustion control elements. The ECM includes a field programmable gate array (FPGA) coupled to the plurality of driver banks and configured to provide firing signals to at least twelve high side driver circuits to simultaneously drive at least twelve combustion control elements respectively coupled to the at least twelve high side driver circuits. The at least twelve combustion control elements are enabled by the respective low side driver circuits coupled to each of the at least twelve combustion control elements.

In another aspect, a method for controlling fuel combustion in an engine using an engine controller module (ECM) is provided. The method includes providing, in the ECM, a plurality of driver banks each including two low side driver circuits and a high side driver circuit, and each driver bank being coupled to two combustion control elements of the engine. The method includes providing a field programmable gate array (FPGA) coupled to the plurality of driver banks. The method includes providing a plurality of firing signals simultaneously from the FPGA to at least twelve high side driver circuits to simultaneously drive twenty four combustion control elements respectively coupled to the at least twelve high side driver circuits to control fuel combustion in the engine. Each of the twenty four combustion control elements are enabled by the respective low side driver circuits coupled to each of the twenty four combustion control elements.

In yet another aspect, an engine control module (ECM) is provided. The ECM includes a plurality of driver banks configured to drive a plurality of combustion control elements. Each of the plurality of driver banks includes two low side driver circuits and a high side driver circuit. The high side driver circuit in each of the plurality of driver banks is shared pairwise by two combustion control elements in the plurality of combustion control elements, and each one of said at least two low side driver circuits is respectively associated with the two combustion control elements. The ECM includes a programmable logic device (PLD) coupled to the plurality of driver banks and configured to provide firing signals to at least twelve high side driver circuits to simultaneously drive at least twelve combustion control elements respectively coupled to the at least twelve high side driver circuits. The at least twelve combustion control elements are enabled by the respective low side driver circuits coupled to each of the at least twelve combustion control elements.

DETAILED DESCRIPTION

Figure 1:
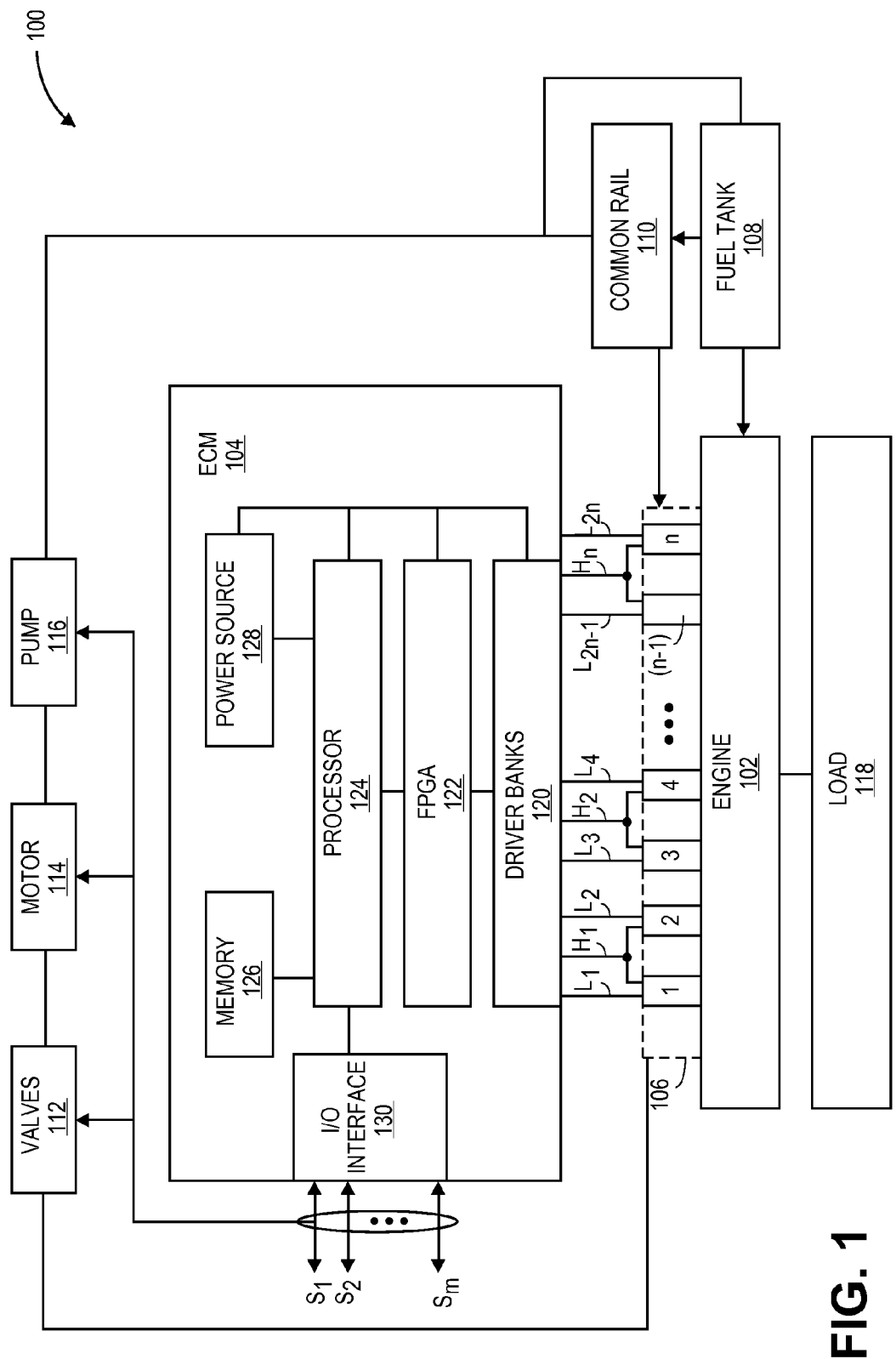
FIG. 1 illustrates a machine including an electronic control module (ECM), in accordance with an aspect of this disclosure.

Now referring to the drawings, wherein like reference numbers refer to like elements, there is illustrated in FIG. 1, a machine 100. The machine 100 may be a mobile or a stationary machine that performs operations associated with industries such as mining, construction, farming, transportation, landscaping, transportation, or the like. For example, the machine 100 may be a track type tractor or dozer, a motor grader, a drilling station, a car, a truck, a bus, or other types of stationary or mobile machines known in the art. In one aspect, the machine 100 may be a vehicle including engine(s) and a plurality of combustion control elements. In one aspect, the machine 100 may be operating on a worksite and is in communication with a base station and a global navigation satellite system (GNSS) for operation. While the following detailed description describes an exemplary aspect in connection with the machine 100, it should be appreciated that the description applies equally to the use of the present disclosure in other machines.

The machine 100 may include an engine 102, an engine control module (ECM) 104, and a plurality of combustion control elements 106. The machine 100 may also include a fuel tank 108, a common rail 110, valves 112, a motor 114, and a pump 116. Additionally or optionally, the machine 100 may include or may be coupled to a load 118. It is to be noted that machine 100 may include other components, including but not limited to, vehicular parts including tires, wheels, engagement mechanisms, transmission, steering system, sensor modules, motors, on-board communication systems, fuel filters, catalytic converters, axles, crankshafts, camshafts, gear systems, clutch systems, batteries, throttles, actuators, hydraulic systems, suspension systems, cooling systems, fuel systems, exhaust systems, chassis, ground engaging tools, imaging systems, and the like (not shown).

The engine 102 may be a large gas engine, a diesel engine, a dual fuel engine (natural gas-diesel mixture), a hybrid electric-natural gas-fossil fuel engine, or any other type of large engine known to one of ordinary skill in the art. In one aspect, the engine 102 is a hybrid engine in which a plurality of fuels may be combusted. Such combustion may occur separately or at the same time for the different types of fuels. The engine 102 may be coupled at its input to the plurality of combustion control elements 106 and, at an output, to the load 118. The engine 102 may also be coupled to the fuel tank 108. In one aspect, the engine 102 may be an in-line six cylinder engine, although it is understood, that the aspects of the present disclosure are equally applicable to other types of engines such as V-type engines and rotary engines, and that the engine 102 may contain any number of cylinders or combustion chambers.

The engine control module (ECM) 104 is a programmable electronic device that may be removably attached to various sensor and actuator systems of the machine 100. In one aspect, the ECM 104 is coupled to and is configured to control the plurality of combustion control elements 106. Additionally or optionally, the ECM 104 may be configured to control various parameters associated with the engine 102, including but not limited to, air/fuel ratio, ignition timing, engine idle speed, opening and closing of the valves 112, operation of the motor 114, operation of the pump 116, and operation of components configured to perform diagnosis and failure management. In one aspect, the ECM 104 may have a protective cover to provide protection from temperature variations and external electromagnetic fields. In various implementations of the disclosure, only one ECM 104 may be provided to implement the various features and functionalities of the disclosure. Alternatively, more than one ECM similar to the ECM 104 could be provided.

The ECM 104 may include a processor 124, a memory 126, a power source 128, a field programmable gate array (FPGA) 122, a plurality of driver banks 120, and an input/output (I/O) interface 130. It is to be noted that although not explicitly shown, the ECM 104 may include other components such as heat sinks, a governor such as a proportional integral derivative (PID) controller for regulating speed of the engine 102, signal converters and voltage converters, analog to digital converters (ADCs) and digital to analog converters (DACs), amplifiers, filters, backup processors and/or co-processors, and circuitry including power supply circuitry, signal conditioning circuitry, solenoid driver circuitry, analog circuits, communication chips (e.g., CAN chips, GPS chips, etc.), phase locked loops (PLLs), and/or programmable logic arrays or other application specific integrated circuits (ASICs). These components of the ECM 104 may be included on a single layer or a multi-layer printed circuit board (PCB).

In one aspect, the processor 124 of the ECM 104 may be an n-bit microprocessor, where 'n' is an integer (e.g., n=16, 32, etc.) operating at a particular clock frequency (e.g., 40 MHz). The processor 124 is coupled to the memory 126, the FPGA 122, the power source 128, and the I/O interface 130. Generally, based upon sensor data received at the I/O interface 130, the processor 124 is configured to issue command and control signals to the FPGA 122. Such sensor data may include a plurality of sensor input signals $S_1$-$S_m$ ('m' being an integer) which correspond to one or more sensor inputs such as engine operating conditions including engine speed, engine temperature, pressure of the actuation fluid, cylinder piston position and so forth that are used to determine the precise combination of combustion or injection parameters for a subsequent event. For example, the processor 124 may be used to control many aspects of fuel injection including but not limited to the fuel injection timing, the total fuel injection quantity during an injection event, the fuel injection pressure, the number of separate injections or fuel shots during each injection event, the time intervals between the separate injections or fuel shots, the time duration of each injection or fuel shot, the fuel quantity associated with each injection or fuel shot, the actuation fluid pressure, current level of the injection waveform, a rate or a change of rate of fuel flow associated with each fuel shot, and any combination of the above parameters. Each of such parameters may be variably controllable independent of (or, dependent on) engine speed and the load 118.

The memory 126 is connected to the processor 124 and stores computer readable and computer executable instruction sets, fuel maps, lookup tables, variables, and the like. In one aspect, the memory 126 may be an electrically erasable programmable read-only memory (EEPROM), although other memory types could be used (e.g., random access memory (RAM) units), as is known. In one aspect, the memory 126 includes computer executable instructions thereupon, which when executed by the processor 124 cause the processor to program the FPGA 122 to carry out the various features and functionalities of the present disclosure.

The FPGA 122 may be a programmable semiconductor chip that may be configured to receive input signals from the processor 124. In response to the input signals, the FPGA 122 is configured to output a plurality of firing signals to the plurality of driver banks 120. An exemplary pinout block diagram of the FPGA 122 is discussed with respect to FIG. 5. In one aspect, the FPGA 122 includes a matrix of addressable Configurable Logic Blocks (CLBs) connected through programmable interconnects. By way of example only, the FPGA 122 may be implemented based on static random access memory (SRAM) or Flash/EEPROM that may be reprogrammed based upon control signals from the processor 124. The FPGA 122 may be implemented using one or more FPGAs. The FPGA 122 may be configured via application software to generate different combustion control elements 106 waveforms (e.g., injector/ignition waveforms) based on operating parameters of the engine 102 such as speed/timing, fuel rail pressure, etc. Further, it is to be noted that although the FPGA 122 is being used to implement the features and functionalities of the various aspects of the disclosure, and this disclosure discusses the FPGA 122 as an example, instead of or in addition to the FPGA 122, one or more programmable logic devices (PLDs) may be used. For example, programmable logic arrays (PLAs) or programmable gate arrays (PGAs) instead of the FPGA 122 may be used to provide the features and functionalities of this disclosure. Such PLDs may be utilized to provide a customized solution for controlling the combustion control elements 106. The PLDs may be programmable using software and code implemented in the ECM 104 or may be remotely programmable using a processor external to the machine 100.

The plurality of driver banks 120 may include drivers to provide or output a plurality of waveforms to the plurality of combustion control elements 106. It is to be noted that the plurality of driver banks 120 may be connected to the plurality of combustion control elements 106 via one or more electromechanical actuators (e.g., piezoelectric actuators). Alternatively, the plurality of driver banks 120 may be connected directly to the plurality of combustion control elements 106.

Figure 2:
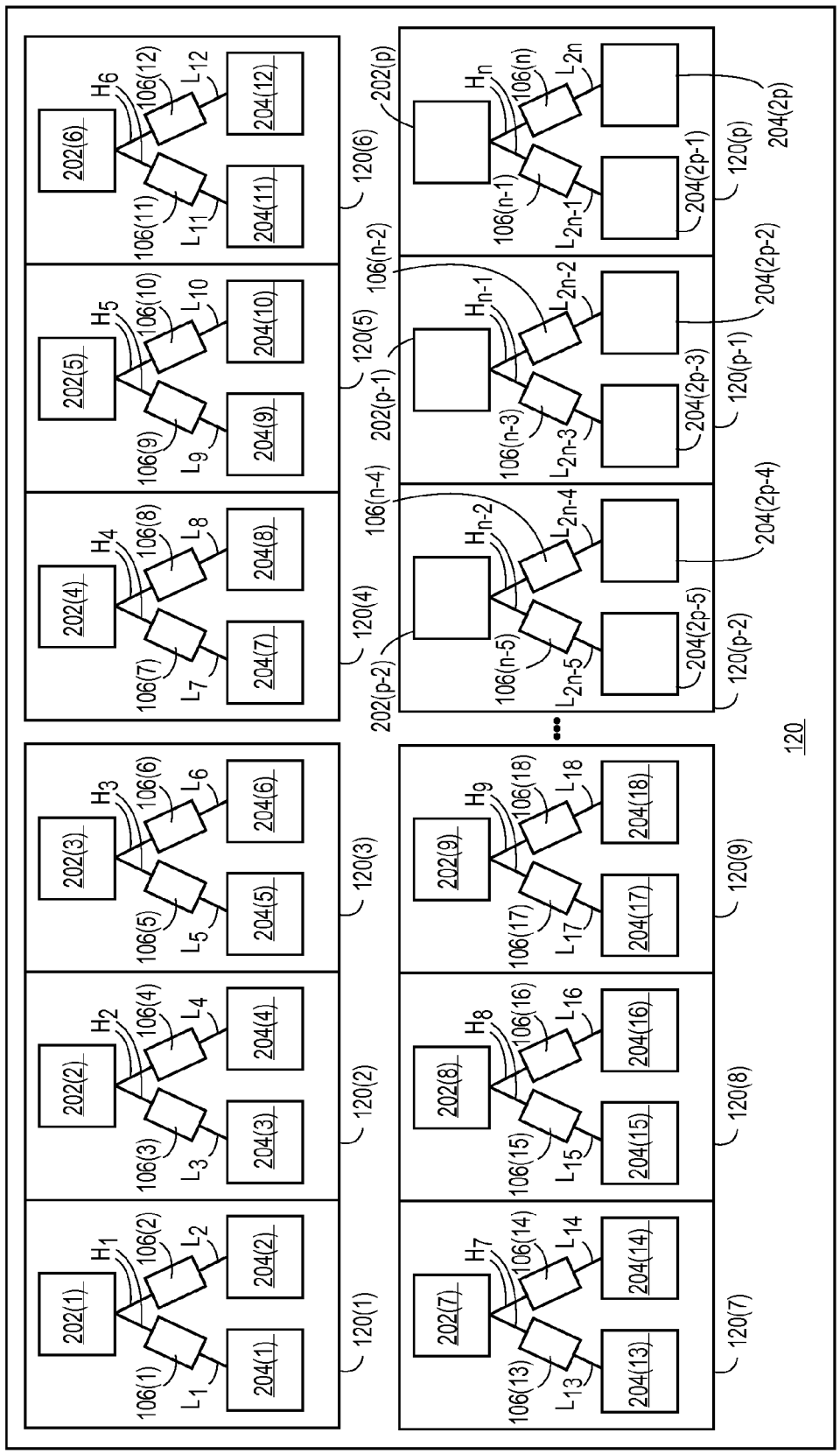
FIG. 2 illustrates a schematic of a driver bank of the ECM of FIG. 1, in accordance with an aspect of this disclosure.

FIG. 2 illustrates a schematic arrangement or layout of the plurality of driver banks 120. The plurality of driver banks 120 include driver banks 120(1)-120(p), where the index 'p' is an integer. In one aspect, the plurality of driver banks 120 includes twelve driver banks 120(1)-120(12), or p=12, although in other aspects a higher or a lower number of driver banks may be present.

Each of the plurality of driver banks 120(1)-120(p) may include a single high driver circuit 202(1)-202(p), respectively, and at least two low side driver circuits 204(1)-204(2p), shown as pairs in FIG. 2. For example, the driver bank 120(1) includes the single high side driver circuit 202(1) per two low side driver circuits 204(1), 204(2) controlled by configuring the FPGA 122. Such an arrangement of one high side driver circuit (e.g., high side driver circuit 202(1)) per two low side driver circuits (e.g., low side driver circuits 204(1), 204(2)) reduces a number of internal components but allows flexibility of current waveforms provided to the combustion control elements 106 by the plurality of driver banks 120(1)-120(p). The single high side driver circuit per two low side driver circuit configuration is used to share components and reduce control complexity (in contrast with using a single high side driver circuit with only one low side driver circuit), but still maximizes thermal efficiency and allows for overlapping injection of waveforms outputted to the combustion control elements 106. The term "high side" may relate to a driver circuit being configured to source current from the power source 128 to a corresponding pair of combustion control elements in the plurality of combustion control elements 106. Likewise, the term "low side" may relate to a driver circuit being configured to connect or disconnect a corresponding combustion control element in the plurality of combustion control elements 106 to a ground, and therefore sink current from the corresponding combustion control element in the plurality of combustion control elements 106. In various implementations of this disclosure, providing one high side driver circuit (e.g., high side driver circuit 202(1)) for every two low side driver circuits (e.g., low side driver circuits 204(1), 204(2)) per every two combustion control elements (e.g., combustion control elements 106(1), 106(2)) provides a highly distributed combustion control element driver bank topology of the plurality of driver banks 120 in the ECM 104. This distributed configuration enables the ECM 104 to support higher current waveforms without generating as much heat in the ECM 104 as results when fewer switches such as FETs are used to control the flow of activation currents to each of the combustion control elements 106. Providing two low side driver circuits for every high side driver circuit per every two combustion control element also eliminates the need for diodes to control which combustion control element the activation current goes to. The FPGA 122 may also be configured through programming to control the firing of 12 combustion control elements at a time, and a total of 24 combustion control elements out of the combustion control elements 106. The combustion control elements 106 may be configured to fire at any point throughout the entire 360° of the crank angle of the engine 102.

As illustrated in FIG. 2, the high side driver circuit 202(1) is coupled at a common output to the combustion control element 106(1) and to the combustion control element 106(2). That is, each of the high side driver circuits 202(1)-202(p) in each of the plurality of driver banks 120(1)-120(p) may be shared pairwise by two combustion control elements (e.g., the combustion control element 106(1) and to the combustion control element 106(2)) in the plurality of combustion control elements 106. Both the combustion control element 106(1) and the combustion control element 106(2) receive a common output signal $H_1$ from the high side driver circuit 202(1). Similar couplings are present for the remaining high side driver circuits 202(2)-202(p) each of which output signals $H_2$-$H_p$, respectively, to respective combustion control elements 106(3)-106(n), as also illustrated in FIG. 2. In one aspect, each of the high side driver circuits 202(1)-202(p) is coupled to at least two of the low side driver circuits 204(1)-204(2p). For example, the high side driver circuit 202(1) is coupled to the two low side driver circuits 204(1) and 204(2) via the corresponding combustion control elements 106(1) and 106(2), respectively. The low side driver circuits 204(1)-204(2p) are configured to input low side signals $L_1$-$L_{2p}$ from the corresponding combustion control elements 106(1)-106(n) for grounding. In one aspect, 2p=n. In one exemplary implementation, the driver banks 120(1)-120(p) including the high side driver circuits 202(1)-202(p) and the low side driver circuits 204(1)-204(2p) may be implemented on a single integrated circuit (IC) chip having a plurality of input and output pins. By way of example only, such an IC chip is illustrated in and discussed with respect to FIG. 5. Further by way of example only and not by way of limitation, the high side driver circuits 202(1)-202(p) and the low side driver circuits 204(1)-204(2p) may be implemented using metal oxide semiconductor field effect transistor (MOSFET) technology, although other types of fabrication technologies may be used. Alternatively, discrete components may be used to implement the driver banks 120(1)-120(p). Internal details of the high side driver circuits 202(1)-202(p) are discussed with respect to FIG. 3, using only one high side driver circuit 202(1) as an example. Likewise, internal details of the low side driver circuits 204(1)-204(2p) are discussed with respect to FIG. 4, using only two low side driver circuits 204(1) and 204(2) as an example. It is to be noted that although FIG. 2 illustrates the combustion control elements 106(1)-106(n) to be inside the plurality of driver banks 120, such illustration is merely for showing the coupling of the combustion control elements 106(1)-106(n) with the high side driver circuits 202(1)-202(p) and the low side driver circuits 204(1)-204(2p). As illustrated in FIG. 1, combustion control elements 106(1)-106(n) exist outside the ECM 104 and not inside the ECM 104, as may be understood by one of ordinary skill in the art in view of this disclosure.

Referring back to FIG. 1, the plurality of combustion control elements 106 include combustion control elements 106(1)-106(n). In one aspect, the combustion control elements 106(1)-106(n) are injectors or fuel injectors. In another aspect, the combustion control elements 106(1)-106(n) are ignition coils associated with one or more spark plugs. In still another aspect, the combustion control elements 106(1)-106(n) are a combination of injectors and ignition coils. The combustion control elements 106(1)-106(n) may be one or more of gas admission valves, intake valves, pre-chamber valves, exhaust valves, and/or glow plugs. Each of the combustion control elements 106 are controlled or electrically actuated by a plurality of waveforms outputted by the plurality of driver banks 120. For example, an activation (opening or closing) of the combustion control elements 106 controls intake and/or consumption of fuel in a combustion chamber of the engine 102, as is known. In various implementations, each of the combustion control elements 106(1)-106(n) is connected by corresponding signal lines $L_1, L_2, H_1, \ldots L_{2n-1}, L_{2n}, H_n$ ('n' being an integer) to the plurality of driver banks 120(1)-120(n) of the ECM 104 to control the opening and closure of the combustion control elements 106. For example, when the combustion control elements 106 are injectors, the movement of a nozzle needle relative to a nozzle seat is controlled by the plurality of waveforms provided by signal lines $L_1, L_2, H_1, \ldots, L_{2n-1}, L_{2n}, H_n$. The combustion control elements 106(1)-106(n) may be connected to the common rail 110 that stores fuel from the fuel tank 108 at high pressure. The operation of the common rail 110 is known to one of ordinary skill in the art and will not be described herein.

The machine 100 includes the valves 112 to control the flow of fuel(s) from the fuel tank 108. The valves 112 may be coupled to the ECM 104 and may be configured to be controlled by the processor 124. Likewise, the motor 114 and the pump 116 may be configured to move fuel from the fuel tank 108 to the engine 102 and/or the common rail 110, or to an overflow storage in the machine 100, as known to one of ordinary skill in the art. The load 118 may be a machine implement, a blade, a wheel, a drill, a vehicle transmission, a hydraulic pump, a generator, or other implements that are coupled to an output of the engine 102 via one or more output shafts or actuators (not shown). In one aspect, the load 118 may be optional, e.g., when the engine 102 is idling or is running diagnostics.

Figure 3:
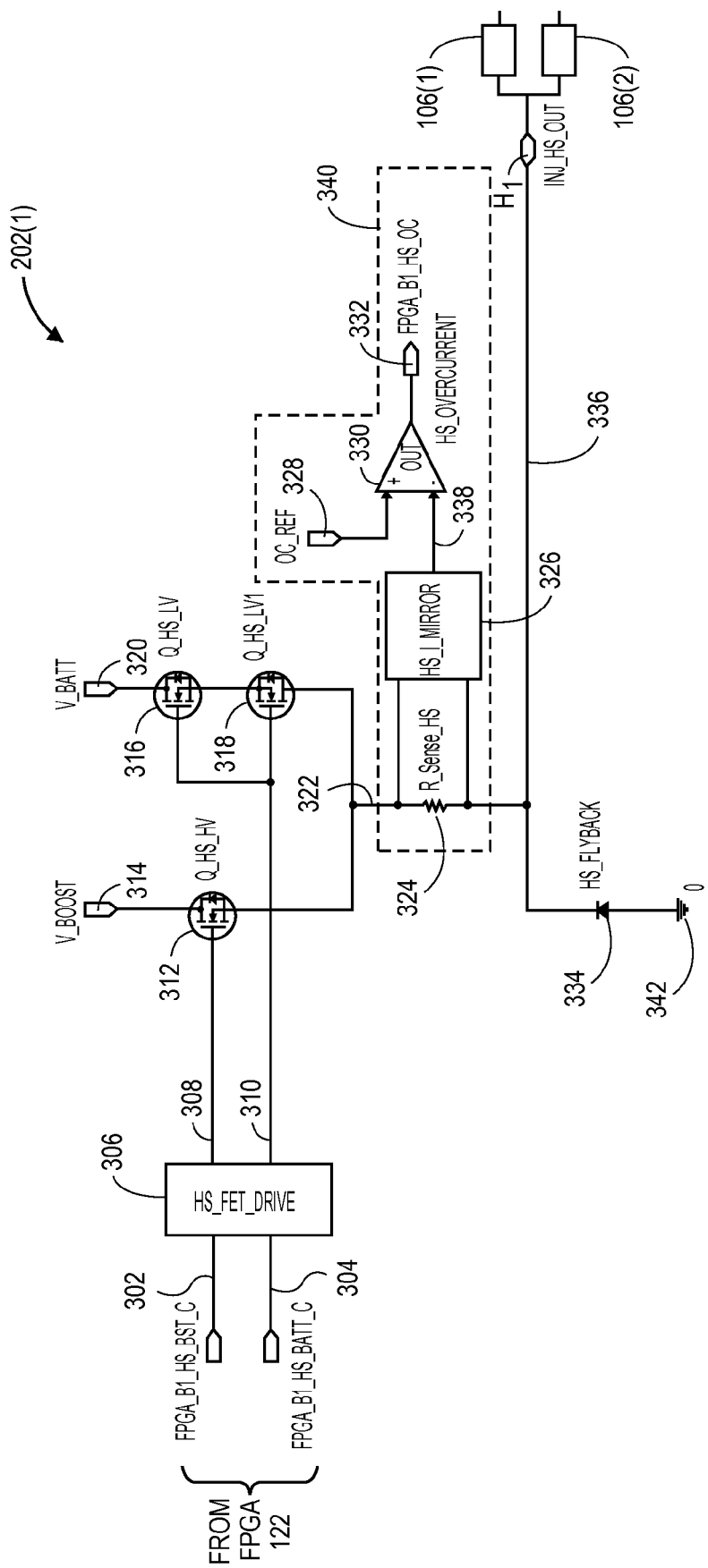
FIG. 3 illustrates a high side driver circuit of the driver bank of FIG. 2, in accordance with an aspect of this disclosure.

FIG. 3 illustrates the high side driver circuit 202(1), according to an aspect of the disclosure. The high side driver circuit 202(1) includes a first input line 302 coupled to a first output line ("FPGA_B1_BST_C") of the FPGA 122. The first input line 302 receives one or more firing signals from the FPGA 122, as discussed with respect to FIGS. 6, 7, and 9, for example. For example, the first input line 302 may receive one or more logic level signals (e.g., at 3.3V, 5V, etc.) from the first output line of the FPGA 122. A second input line 304 may receive one or more logic level signals (e.g., at 3.3V, 5V, etc.), from a second output line ("FPGA_B1_HS_BATT_C") of the FPGA 122. The first input line 302 and the second input line 304 are coupled to a FET driver module 306. The FET driver module 306 includes driver circuitry to generate drive currents, enable lines to activate drive circuitry, etc. In one implementation, the FET driver module 306 takes a logic-level control signal (firing signal) from the FPGA 122, and applies a voltage to the gate of the appropriate MOSFET amongst the first MOSFET 312, the second MOSFET 316, and a third MOSFET 318 (either battery voltage or boost voltage) high enough to turn on the MOSFET, i.e., the output voltage of the MOSFET plus 4-6V. In some implementations, the third MOSFET 318 may be optional. The FET driver module 306 provides a first output 308 and a second output 310. The first output 308 is configured to an input gate of a first MOSFET 312 and provides a gate signal to the first MOSFET 312. The second output 310 is coupled to respective input gates of a second MOSFET 316 and the third MOSFET 318 and provides gate signals to the second MOSFET 316 and the third MOSFET 318. A first voltage source 314 is coupled to and provides a boost voltage to a source of the first MOSFET 312. In this respect, the first voltage source 314 may be referred to as a boost voltage source. A second voltage source 320 is coupled to and provides a battery voltage to a source of the second MOSFET 316. In this respect, the second voltage source 320 may be referred to as a battery voltage source. In one aspect, the first voltage source 314 outputs a higher voltage than the second voltage source 320. In one aspect, the first voltage source 314 provides a voltage in a range of 50-190V. In one aspect, the second voltage source 320 provides a voltage substantially equal to 24V. It is to be noted that the ranges and values of the voltages output by the first voltage source 314 and the second voltage source 320 are by way of example only and not by way of limitation, as other values and ranges may be provided depending upon specific applications in which the high side driver circuit 202(1) is used. The third MOSFET 318 is connected in series with the second MOSFET 316 in a manner that a drain of the second MOSFET 316 is connected to a source of the third MOSFET 318. In one aspect, the dual arrangement of the second MOSFET 316 and the third MOSFET 318 limit the first voltage source 314 from being applied to or from being coupled to the second voltage source 320. It is to be noted that although MOSFETs are being discussed in the high side driver circuit 202(1), other equivalent transistors may be used. Further, the number of MOSFETs used may be varied to achieve output performance similar to that achieved using the first MOSFET 312, the second MOSFET 316, and the third MOSFET 318. A drain of the first MOSFET 312 is coupled to a drain of the third MOSFET 318 at a common output 322. The common output 322 is coupled to an input of a high side overcurrent protection circuit 340. It is to be noted that instead of the first MOSFET 312, the second MOSFET 316, and/or the third MOSFET 318, other types of transistors, gates, or switching devices (e.g., other types of FETs) could be used.

The high side overcurrent protection circuit 340 may include a sensing resistance 324 between the input terminals of a current mirror 326. An output 338 of the current mirror 326 may be provided to a negative input of a comparator 330. The comparator 330 may be coupled to an overcurrent reference current 328 and is configured to provide an output 332 to the FPGA 122 based upon a comparison between the output 338 and the overcurrent reference current 328. The high side overcurrent protection circuit 340 is coupled in parallel to the remaining components of the high side driver circuit 202(1), as illustrated in FIG. 3.

The common output 322 is provided on an output line 336 to the combustion control elements 106(1) and 106(2) as the common output signal $H_1$. The high side driver circuit 202(1) may include a flyback diode 334 coupled to the common output 322 and a ground 342, as illustrated. The flyback diode 334 (interchangeably referred to as a snubber diode, freewheeling diode, suppressor diode, suppression diode, clamp diode or catch diode) is a diode used to eliminate flyback, which is a sudden voltage spike seen across an inductive load (e.g., the combustion control elements 106(1) and 106(2)) when a supply voltage (e.g., voltage from the first voltage source 314) is suddenly reduced or removed. For example, the common output signal $H_1$ may be a composite signal including respective outputs representative of both the first voltage source 314 and the second voltage source 320 to control the combustion control elements 106(1) and 106(2). As the common output signal $H_1$ transitions between the two voltages, i.e., the boost voltage from the first voltage source 314 and the battery voltage from the second voltage source 320, noise spikes may occur that may enter the high side driver circuit 202(1) and cause damage. The flyback diode 334 is configured to prevent such damage. In one aspect, a plurality of flyback diodes similar to the flyback diode 334 may be used.

Generally, the common output signal $H_1$ is outputted in response to firing signals on the first input line 302 and the second input line 304 received from the FPGA 122. The high side driver circuit 202(1) outputs the common output signal $H_1$ as a current signal in response to the firing signals on the first input line 302 and the second input line 304. In this respect, the first input line 302 and the second input line 304 act as control signals for outputting the voltage from the first voltage source 314 and the voltage from the second voltage source 320. In one aspect, the common output signal $H_1$ is a series of waveforms, as discussed with respect to FIG. 6. The firing signals on the first input line 302 and the second input line 304 may be programmed for timing, duration, periodicity, amplitude, or other signal parameters to control the common output signal $H_1$ to the combustion control elements 106(1) and 106(2). Such programmability is achieved based on programming of the FPGA 122 by the processor 124 that may take into account current and past system parameters and desired performance parameters for the machine 100 that may be stored in the memory 126 and received over the I/O interface 130. Likewise, other high side driver circuits 202(2)-202(p) provide respective output waveforms to other combustion control elements 106(3)-106(n) simultaneously to control combustion in the engine 102.

Figure 4:
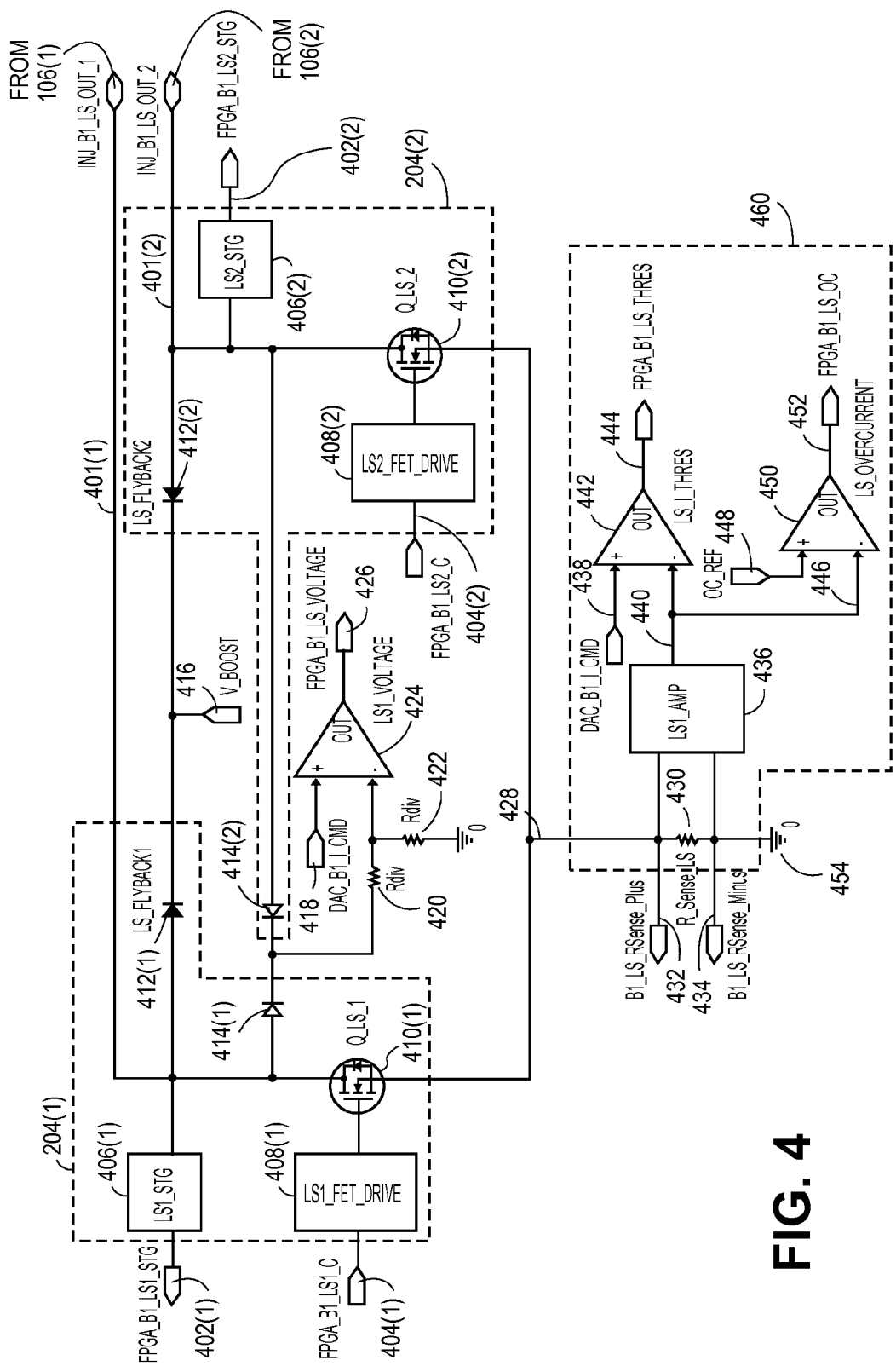
FIG. 4 illustrates a combined circuit for two low side driver circuits of the driver bank of FIG. 2, in accordance with an aspect of the disclosure.

FIG. 4 illustrates a combined circuit for two low side driver circuits 204(1) and 204(2) of the plurality of driver banks 120 of FIG. 2, in accordance with an aspect of the disclosure. It is to be noted that although the low side driver circuits 204(1) and 204(2) are presented in FIG. 4, the discussion herein applies equally to other low side driver circuits 204(3)-204(2p). In one aspect, the two low side driver circuits 204(1) and 204(2) are integrated into a single chip on a common substrate. Alternatively, two low side driver circuits 204(1) and 204(2) may be present as separate discrete circuits and the discussion with respect to one of the two low side driver circuits 204(1) and 204(2) is equally applicable to the other of the two low side driver circuits 204(1) and 204(2).

The low side driver circuit 204(1) is coupled to the combustion control element 106(1) at an output line 401(1). When the output line 401(1) is at a high logic level, the combustion control element 106(1) is enabled for operation and the common output signal $H_1$ from the high side driver circuit 202(1) may then be provided to the combustion control element 106(1) to activate the combustion control element 106(1). A signal on the output line 401(1) is provided to a first low side driver MOSFET 410(1) at a source of the first low side driver MOSFET 410(1). The low side driver circuit 204(1) may include a short to ground (STG) input 402(1) from the FPGA 122 coupled to a low side short to ground fault protection (LS_STG) module 406(1). The LS_STG module 406(1) detects if there is a low-side short-to-ground fault and provides a fault bit to the FPGA 122 to communicate if a low-side short-to-ground fault kind of fault is present. The low side driver circuit 204(1) includes a low side control (LS_C) input 404(1) from the FPGA 122 coupled to an FET driver 408(1). The LS_C input 404(1) is a logic level output (e.g., at 3.3V, 5V, etc.) from the FPGA 122 that indicates to the first low side driver MOSFET 410(1) to turn on or turn off. An output of the FET driver 408(1) is coupled to a gate of the first low side driver MOSFET 410(1). The first low side driver MOSFET 410(1) may be coupled to a first diode 414(1) at the source. The first diode 414(1) is forward biased with respect to a source-drain current flow of the first low side driver MOSFET 410(1).

Likewise, the low side driver circuit 204(2) is coupled to the combustion control element 106(2) at an output line 401(2). When the output line 401(2) is at a high logic level, the combustion control element 106(2) is enabled for operation and the common output signal $H_1$ from the high side driver circuit 202(2) may then be provided to the combustion control element 106(1) to activate the combustion control element 106(1). In this respect, either one or both the combustion control elements 106(1), 106(2) may be simultaneously activated, depending on whether enable signals on the output lines 404(1), 404(2), respectively, are at a specific logic level (e.g., a high logic level). A signal on the output line 401(2) is provided to a second low side driver MOSFET 410(2) at a source of the second low side driver MOSFET 410(2). The low side driver circuit 204(2) may include a short to ground (STG) input 402(2) from the FPGA 122 coupled to an low side short to ground (LS_STG) module 406(2). The LS_STG module 406(2) detects if there is a low-side short-to-ground fault and provides a fault bit to the FPGA 122 to communicate if a low-side short-to-ground fault kind of fault is present. The low side driver circuit 204(2) includes a low side control (LS_C) input 404(2) from the FPGA 122 coupled to an FET driver 408(2). The LS_C input 404(2) is a logic level output (e.g., at 3.3V) from the FPGA 122 that indicates to the second low side driver MOSFET 410(2) to turn on or turn off. An output of the FET driver 408(2) is coupled to a gate of the second low side driver MOSFET 410(2). The second low side driver MOSFET 410(2) includes a second diode 414(2) coupled to the source and forward biased with respect to a source drain current flow of the second low side driver MOSFET 410(2).

An output of the first flyback diode 412(1) and an output of the second flyback diode 412(2) may be commonly coupled to a boost voltage 416 to complete the current path. Using the first flyback diode 412(1) and the second flyback diode 412(2) to boost voltage speeds up the current decay time when the first and the second low side driver circuits 204(1) and 204(2) are turned off. Using the first flyback diode 412(1) and the second flyback diode 412(2) also allows for energy recovery by using flyback current to charge boost supply. Likewise, an output of the first diode 414(1) and an output of the second diode 414(2) may be commonly coupled to an input of a divider circuit formed by resistances 420 and 422. The divider circuit is coupled to a comparator 424 that outputs a voltage 426 based upon a comparison with an input reference voltage 418. The comparator 424 may be configured to determine if the output voltage (divided down) on any of the first and the second low side driver circuits 204(1) and 204(2) is above a reference voltage of a digital to analog converter (DAC, not shown) that sets the current command as a way to measure the output voltage from the first and the second low side driver circuits 204(1) and 204(2).

The respective outputs from the drains of the first low side driver MOSFET 410(1) and the second low side driver MOSFET 410(2) are commonly connected at a line 428 that forms an input to a low side overcurrent protection circuit 460. The low side overcurrent protection circuit 460 may include a positive sensing input 432 and a negative sensing input 434 coupled across the terminals of a sensing resistance 430. A low side amplifier 436 is coupled in parallel to the sensing resistance 430 and is configured to provide a gain to the signal input on the line 428. An output 440 of the low side amplifier 436 is fed to an input 446 of an overcurrent comparator 450 and to a thresholding comparator 442. The overcurrent comparator 450 may compare the output 440 with an overcurrent reference 448 to provide an overcurrent output 452 to the FPGA 122 to indicate if a fault has occurred. The thresholding comparator 442 provides an output 444 based on a command input 438 received from a DAC (not shown) in the ECM 104 to determine whether a current required to control modulation of the waveforms output to the combustion control elements 106 has been achieved. For example, the thresholding comparator 442 is configured to measure current decay time at a tail end of waveforms by comparing a divided down voltage measurement of any of the low-side driver circuits 204(1)'s or 204(2)'s output pin with a software controllable voltage level set by the DAC (not shown). In one aspect, the current on the line 428 is provided to a low side ground 454. Each of the low side driver circuits 204(1)-204(2p) may be used to output an "enable" signal for which of the respective combustion control elements 106(1)-106(n) are to be turned on. Once a particular low side driver circuit amongst the low side driver circuits 204(1)-204(2p) is turned on, a corresponding high side driver circuit to which the low side driver circuit is associated with or coupled to is modulated (e.g., on/off modulated) to control the output current to the corresponding combustion control elements 106, while the particular low side driver circuits in the plurality of low side driver circuits 204(1)-204(2p) are on the whole time. Using this topology, by way of example only, up to 24 combustion control elements 106(1)-106(24) may be simultaneously fired at any point of an engine crank angle of 0°-360° in a distributed manner. For example, with the single high side driver circuit 202(1) to the first and the second low side driver circuits 204(1), 204(2), one of the low side driver circuits (e.g., the first low side driver circuit 204(1)) may be on at a time, controlling which one of the two combustion control elements 106(1) or 106(2) gets the current and is activated or triggered.

Figure 5:
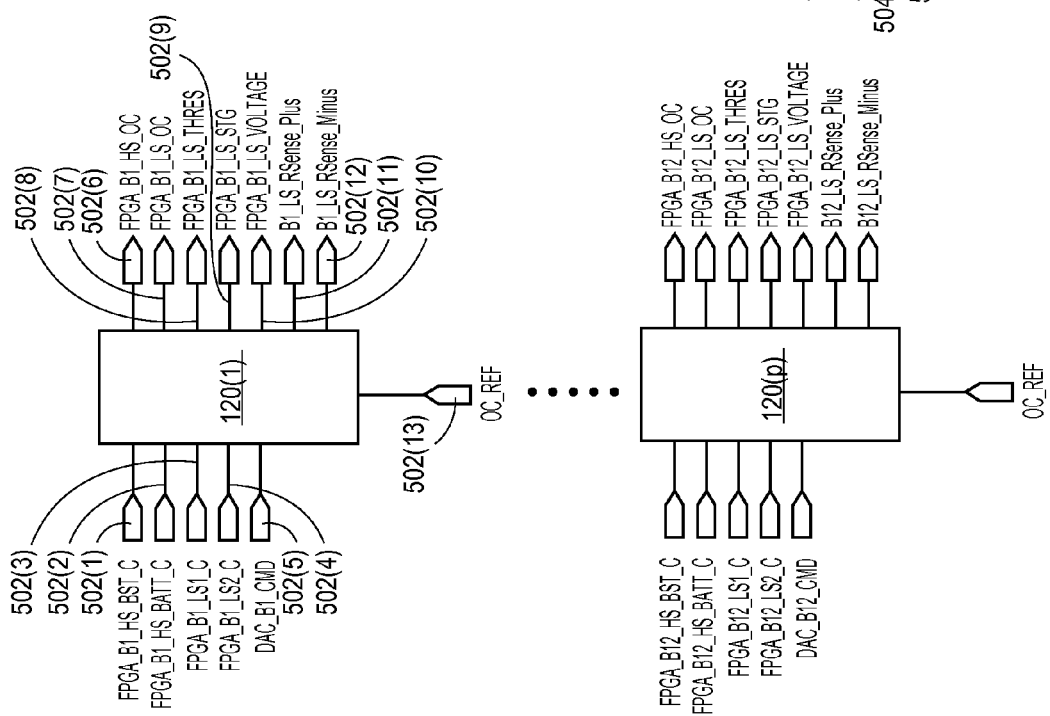
FIG. 5 illustrates a pinout diagram of the driver bank and a field programmable gate array (FPGA) of the ECM of FIG. 1, in accordance with an aspect of the disclosure.

In one aspect, the plurality of driver banks 120 and the FPGA 122 may be implemented in hardware as ICs. FIG. 5 illustrates a pinout diagram of the plurality of driver banks 120 and the FPGA 122 implemented in exemplary ICs, in accordance with an aspect of the disclosure, although in alternative aspects, a discrete component implementation may be used. For example, the high side driver circuits 202(1)-202(p) and the low side driver circuits 204(1)-204(2p) may be implemented on single ICs in a paired arrangement, e.g., the arrangement illustrated in FIG. 2. It is to be noted that the pinout arrangement shown in FIG. 5 is by way of example only and not by way of limitation. For example, other arrangements of input and output pins for the ICs of the plurality of driver banks 120 and the FPGA 122 may exist including higher or lower number of input and/or output pins, as may be understood by one of ordinary skill in the art in view of this disclosure. In one aspect, each of the plurality of driver banks 120(1)-120(p) is identical. The description in FIG. 5 is with respect to one such driver bank 120(1) but is equally applicable to other driver banks 120(2)-120(p). Alternatively, the driver bank 120(1) may be implemented using discrete components and may not be an IC.

The driver bank 120(1) includes a plurality of pins 502(1)-502(13), with similar pins existing for other driver banks 120(2)-120(n). The pin 502(1) may be coupled to the first input line 302 of the high side driver circuit 202(1) and is configured to carry a signal from the FPGA 122 to enable the first voltage source 314 that provides the boost voltage to the first MOSFET 312. The pin 502(2) may be coupled to the second input line 304 of the high side driver circuit 202(1) and is configured to carry a signal from the FPGA 122 to enable the second voltage source 320 that provides the battery voltage to the second MOSFET 316. The pin 502(3) may provide the LS_C input 404(1) signal from the FPGA 122 to the low side driver circuit 204(1). The pin 502(4) may provide the LS_C input 404(2) signal from the FPGA 122 to the low side driver circuit 204(2). The pin 502(5) may provide the command input 438 to the thresholding comparator 442 of the low side driver circuits 204(1) and 204(2). The pin 502(6) may carry the output 332 for the high side overcurrent protection circuit 340 and the pin 502(7) may carry the overcurrent output 452 to the FPGA 122 for the low side overcurrent protection circuit 460. The pin 502(8) may carry the output 444 from the low side driver circuits 204(1) and 204(2) to the FPGA 122. The pin 502(9) may carry the signal STG output 402(1) to the FPGA 122. The pin 502(10) may carry the voltage 426 from the FPGA 122. The pins 502(11) and 502(12) respectively correspond to the positive sensing input 432 and the negative sensing input 434 of the low side overcurrent protection circuit 460, as discussed with respect to FIG. 4. The pin 502(13) may provide the overcurrent reference 448 to the low side overcurrent protection circuit 460.

The FPGA 122 may include pins 504(1)-504(19) providing signals to and/or receiving signals from the plurality of driver banks 120, as well as other circuitry including but not limited to ADCs, DACs, seat detectors, and the like. It is to be noted that the number of pins in the FPGA 122 are by way of example only and not by way of limitation, and in alternative aspects the FPGA 122 may include higher or lower number of pins. In one aspect, the pins 504(1) may be a set of n pins each coupled to the equivalent of the pins 502(6) for the high side driver circuits 202(1)-202(p), respectively, in the driver banks 120(1)-120(p). The pins 504(2) may be a set of pins each coupled to the equivalent of the pins 502(7) for the low side driver circuits 204(1)-204(2p), respectively, in the driver banks 120(1)-120(p). The pins 504(3) may be a set of pins each coupled to the equivalent of pins 502(8) for the low side driver circuits 204(1)-204(2p), respectively, in the driver banks 120(1)-120(p). The pins 504(4) may be a set of pins each coupled to the equivalent of pins 502(9) for the low side driver circuits 204(1)-204(2p), respectively, in the driver banks 120(1)-120(p). The pins 504(5) may be a set of pins each coupled to the equivalent of pins 502(9) for the low side driver circuits 204(1)-204(2p), respectively, in the driver banks 120(1)-120(p). The pins 504(6) may be a set of pins coupled to a detector, such as a seat detector (not shown) for each of the combustion control elements 106(1)-106(n). The pin 504(7) may receive a raw engine speed value of the engine 102 from the processor 124 and the pin 504(8) receives a filtered value for a speed of the engine 102 from the processor 124. The pin 504(9) maybe an external bus interface that the processor 124 communicates to the FPGA 122 through. For example, the pin 504(9) may carry signals corresponding to an address/data bus, and the processor 124 writes to the FPGA 122's registers to configure waveforms, etc., and the processor 124 reads from the FPGA 122 to check fault statuses, etc. The pin 504(10) may receive a clocking signal and the pin 504(11) is a reset pin. The pins 504(12) may be a set of pins coupled to the equivalent of the first input line 302 of the high side driver circuits 202(1)-202(p). The pins 504(13) may be a set of pins each coupled to the equivalent of pins 502(2) for the low side driver circuits 204(1)-204(2p), respectively, in the driver banks 120(1)-120(p). The pins 504(14) may be a set of pins each coupled to the equivalent of pins 502(3) for the low side driver circuits 204(1)-202(2p), respectively, in the driver banks 120(1)-120(p). The pins 504(15) may be a set of pins each coupled to the equivalent of pins 502(4) for the low side driver circuits 204(1)-202(2p), respectively, in the driver banks 120(1)-120(p). The pins 504(16) may be a set of pins each coupled to the equivalent of pins 502(10) for the low side driver circuits 204(1)-202(2p), respectively, in the driver banks 120(1)-120(p). It is to be noted that various sets of pins discussed herein may have varying number of pins based upon the number of pins of the individual plurality of driver banks 120(1)-120(p). In one aspect, the FPGA 122 may have a pin 504(17) to couple to a DAC (not shown) to provide a control command to the DAC. The pin 504(18) may couple to the DAC to provide an overcurrent reference value for the low side overcurrent protection circuit 460 and/or the high side overcurrent protection circuit 340. The pin 504(19) may provide a clocking signal to the pins 504(6) for detection, such as seat detection.

Figure 6:
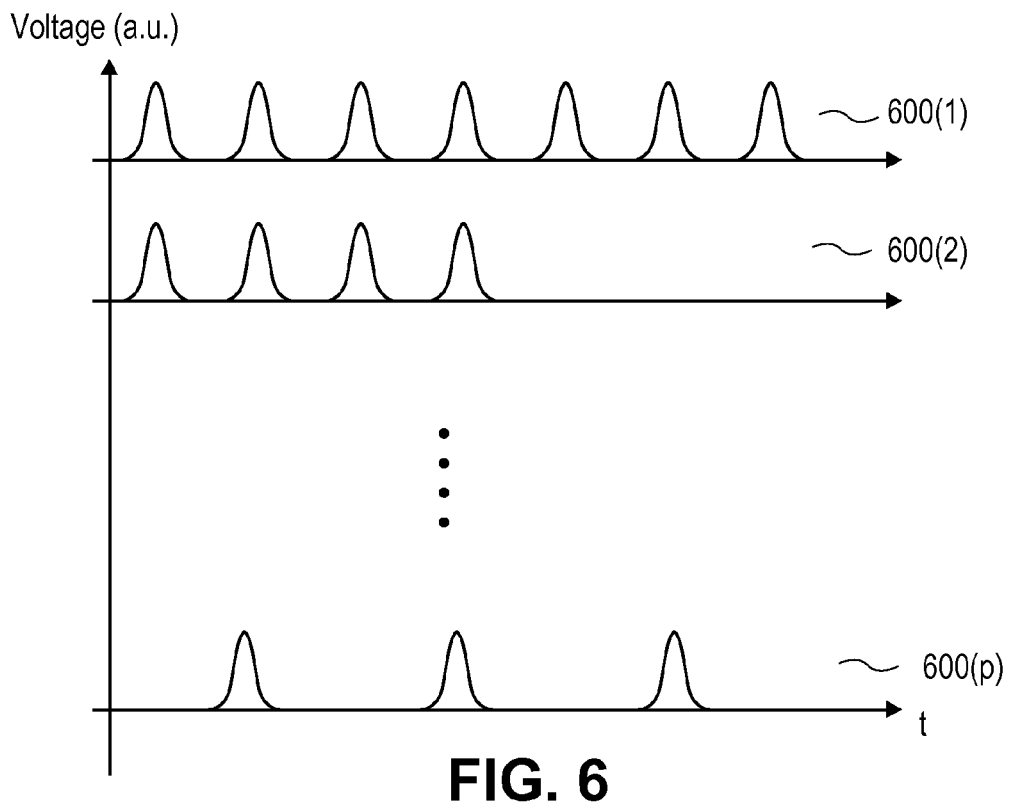
FIG. 6 illustrates exemplary firing signals output from the FPGA, in accordance with an aspect of the disclosure.

FIG. 6 illustrates a plurality of firing signals 600(1)-600(p) from the FPGA 122. In one aspect, the plurality of firing signals are provided to one or more of the plurality of high side driver circuits 202(1)-202(p) and to at least one of the corresponding low side driver circuits 204(1)-204(2p), by the FPGA 122. For example, the firing signal 600(1) may be received by the high side driver circuit 202(1) at the first input line 302, as discussed with respect to FIG. 3.

Figure 7:
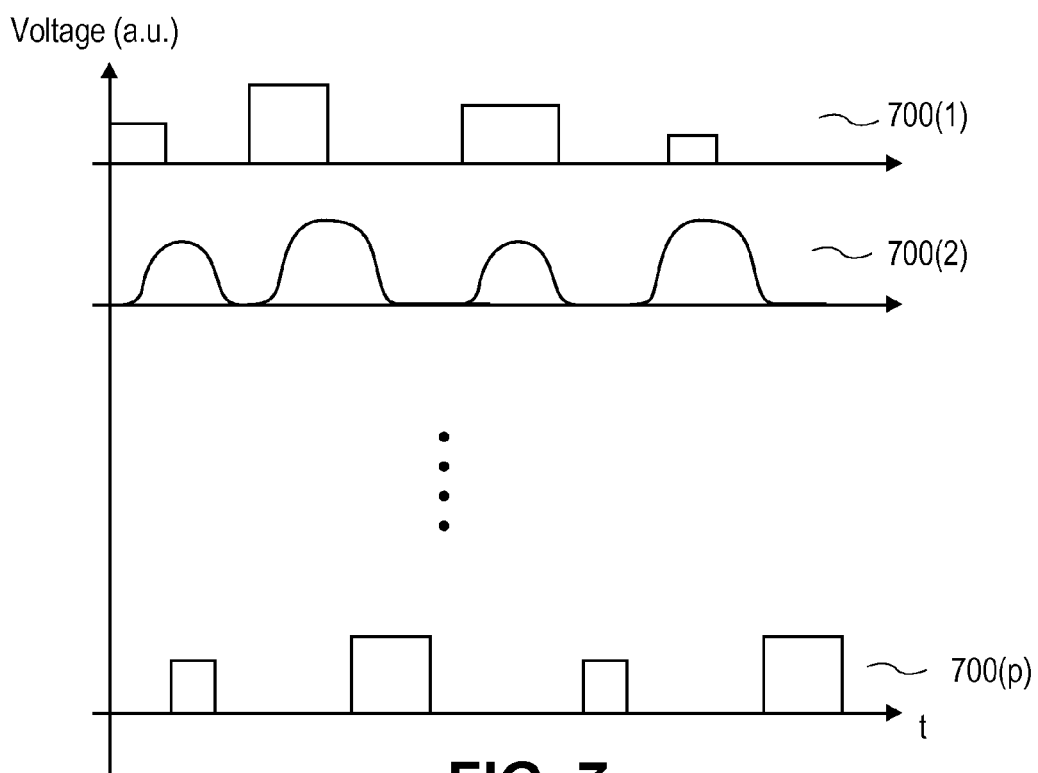
FIG. 7 illustrates exemplary output waveforms from the driver bank to combustion control elements to control combustion of fuel(s) in an engine of the machine of FIG. 1, in accordance with an aspect of the disclosure.

FIG. 7 illustrates a plurality of output waveforms 700(1)-700(p) outputted to the combustion control elements 106 by the high side driver circuits 202(1)-202(p), respectively. In one aspect, the plurality of output waveforms 700(1)-700(p) may be each unique. In another aspect, the plurality of output waveforms 700(1)-700(p) may overlap with each other to control the combustion control elements 106, and therefore, the combustion in the engine 102. For example, the output waveform 700(1) may be output on the output line 336 as the output signal $H_1$. Further by way of example only, such plurality of output waveforms 700(1)-700(p) may include a sequence of on and off electrical signals with varying pulse widths, amplitudes and frequencies based upon the plurality of firing signals 600(1)-600(p) to control combustion in the engine 102 by controlling the activation of the combustion control elements 106.

Figure 9:
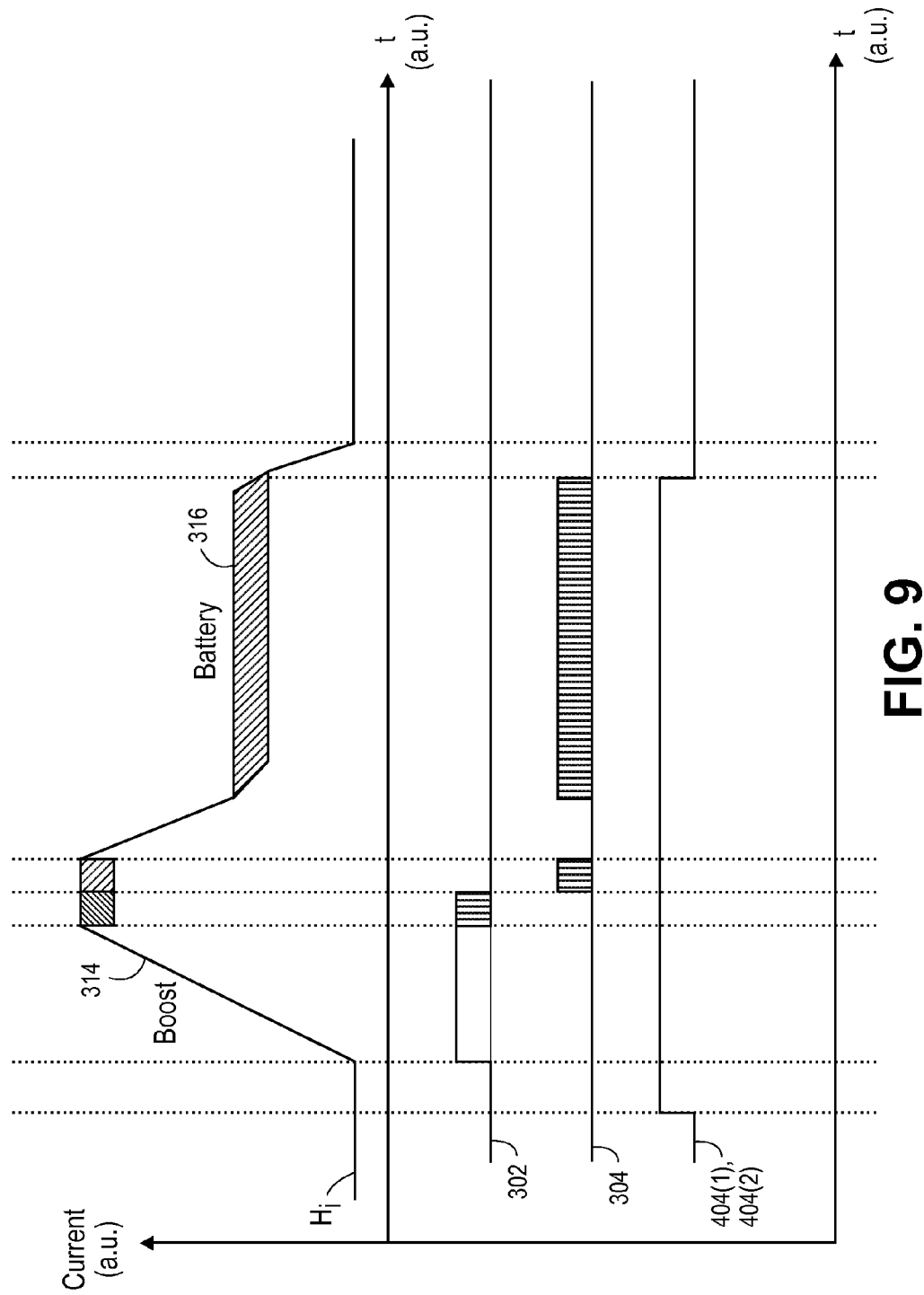
FIG. 9 illustrates exemplary waveforms associated with the combustion control element(s) and the high side and low side driver circuits, in accordance with an aspect of the disclosure.

FIG. 9 illustrates exemplary waveforms associated with the combustion control element(s) 106 and to the high side and low side driver circuits 202, 204, respectively, in accordance with an aspect of the disclosure. In one aspect, the common output signal $H_i$ (i=1, 2, . . . , p) may include, for i=1 for example, the first voltage source 314 providing a boost voltage level, successively followed by the second voltage source 320 providing a battery voltage level from the high side driver circuit 202(1) to one or more of the combustion control elements 106(1), 106(2), coupled at a common point to the high side driver circuit 202(1). It is to be noted that the high side driver circuit 202(1) may output the battery level voltage and the boost level voltage in any order, and the order illustrated in FIG. 9 is by way of example only, and not by way of limitation. Further, the high side driver circuit 202(1) may output the battery level voltage and the boost level voltage as a sequence. Likewise, the other high side driver circuits 202(2)-202(p) may output the common output signals $H_2$-$H_p$, respectively in a similar manner distributed to cover an entire 0°-360° of the crank angle of the engine 102. In one aspect, the common output signal $H_i$ may be a current signal on the output line 336 of the high side driver circuit 202(1), as illustrated in FIG. 9.

FIG. 9 also illustrates a logic level signal on the first input line 302 for firing the first MOSFET 312, a logic level signal on the second input line 304 for firing the second MOSFET 316 and/or the third MOSFET 318. These logic level signals may be transformed by the FET driver module 306 and outputted as the first output 308 and the second output 310 prior to being input to the first MOSFET 312 and the second MOSFET 316 and/or the third MOSFET 318, respectively. In one aspect, the logic level signals on the first input line 302 and the second input line 304 may determine a shape and a timing of the common output signal $H_1$. For example, the logic level signal on the first input line 302 may correspond to the first voltage source 314 providing a boost voltage level or current on the output line 336 of the high side driver circuit 202(1). Likewise, the logic level signal on the second input line 304 may correspond to the second voltage source 320 providing a battery voltage level or current on the output line 336 of the high side driver circuit 202(1). Similarly, the common output signals $H_2$-$H_p$ from the high side driver circuits 202(2)-202(p) may be provided according to the exemplary waveforms illustrated in FIG. 9.

Further, FIG. 9 illustrates an enable logic signal on one or more of the low side control inputs 404(1) and 404(2). The enable logic signal determines which one of the combustion control elements 106(1), 106(2), respectively, will be activated to receive the common output signal $H_1$ from the high side driver circuit 202(1). In one aspect, enable logic signals similar to the enable logic signal in FIG. 9 may be provided to at least twelve and up to twenty four low side driver circuits 204(1)-204(2p) to activate the respective combustion control elements 106(1)-106(p). By way of example only and not by way of limitation, at least twelve and up to twenty four low side driver circuits 204(1)-204(2p) may be enabled to simultaneously drive up to twenty four combustion control elements 106(1)-106(24).

In one aspect, the ECM 104 is configured to maintain injector/ignition waveform flexibility through use of the processor 124 to control the FPGA 122. In one aspect, implementation of the FPGA 122 enables the ECM 104 to be backward compatible with waveforms outputted by previous generations of ECMs, as well as connector pinouts of such ECMs. Increased driver efficiency of the plurality of driver banks 120 is achieved through decreased multiplexing. Further advantages achieved by various implementations in accordance with this disclosure include a reduction in the need for diodes to control which ones of the combustion control elements 106 receive driving current at any point in time and the resulting improvement in the thermal performance of the ECM 104.

INDUSTRIAL APPLICABILITY

Various implementations of the present disclosure are applicable generally to engine control modules for a large variety of different engines and, more particularly, to various methods for controlling fuel combustion in an engine using an engine controller module.

Figure 8:
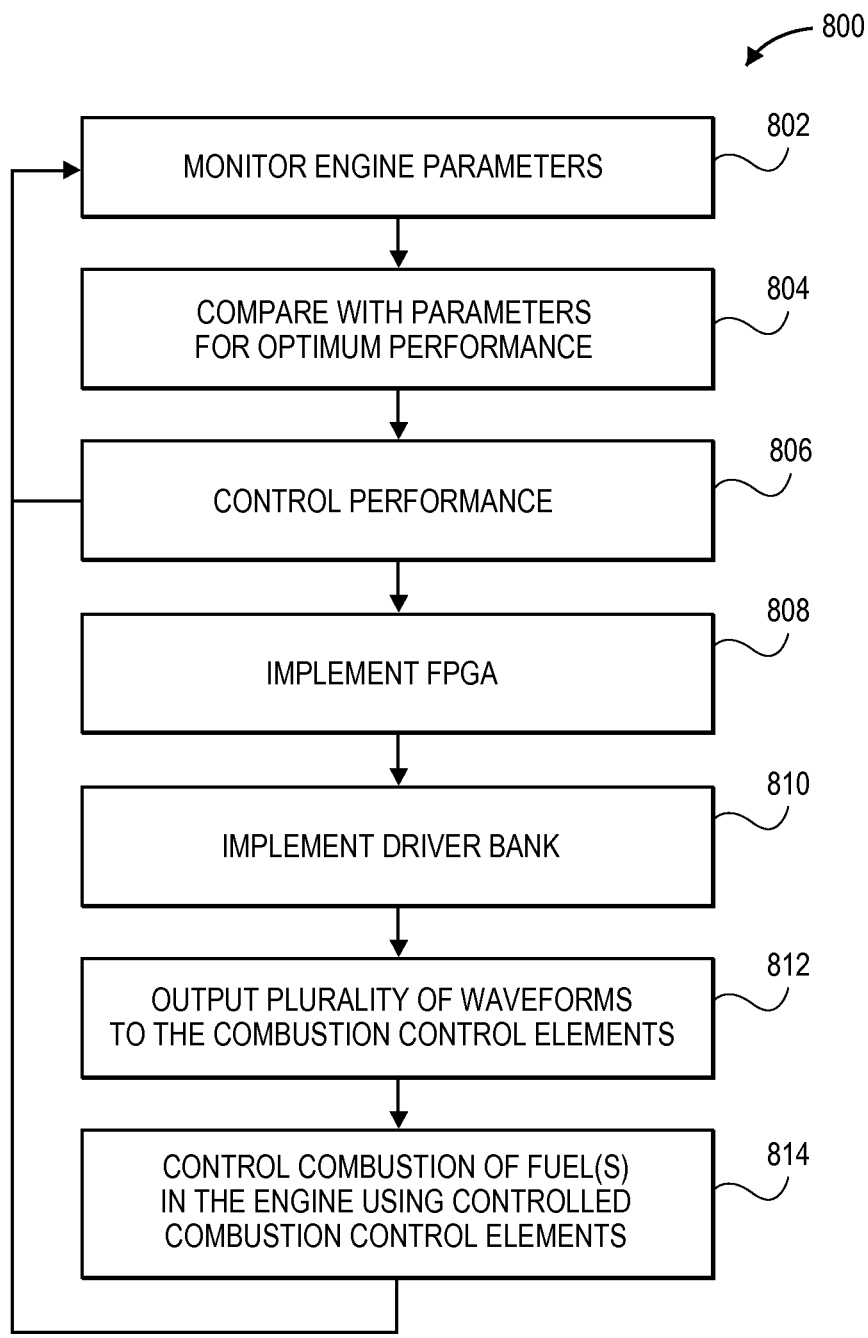
FIG. 8 illustrates a method for controlling fuel combustion in the engine of the machine of FIG. 1, in accordance with an aspect of the disclosure.

FIG. 8 presents a flowchart of a process or method 800 for controlling fuel combustion in the engine 102 using the ECM 104, according to an aspect of the disclosure. One or more operations of the method 800 of may be skipped or combined as a single process, repeated several times, and the flow of operations in the method 800 may be in any order not limited by the specific order illustrated in FIG. 8. For example, various operations may be moved around in terms of their respective orders, or may be carried out in parallel with one or more other operations. Further, the functioning or functionalities of the machine 100 are not affected by an order in which the aspects discussed in FIG. 8 are implemented, and such an order of implementation is by way of example only and not by way of limitation.

The method 800 may begin in an operation 802 where the processor 124 of the ECM 104 is configured to monitor various parameters associated with the engine 102. By way of example only and not by way of limitation, such parameters may be related to engine speed, engine load, engine component, temperature, ambient temperature, pressure, engine fuel capacity, fuel efficiency, fuel type, acceleration, speed, demand, engine rotations per minute (RPMs), combinations thereof, or the like. In one aspect, the processor 124 may receive information related to such engine parameters using one or more sensors via the I/O interface 130. For example, the processor 124 may receive such engine parameter information or data over the plurality of sensor input signals $S_1$-$S_m$. The processor 124 may monitor the parameters of the engine 102 at any time, and may do so continuously, at periodic intervals, or at random instants of time. For example, the processor 124 may monitor the parameters of the engine 102 during idling of the engine 102, during active operation of the engine 102, or both. In one aspect, the processor 124 is configured to store real time data associated with the engine 102 in the memory 126.

In an operation 804, the processor 124 compares the engine parameter information received over the I/O interface 130 with parameters stored in the memory 126. The processor 124 may execute computer executable code stored in the memory 126 to perform such comparison. In one aspect, the memory 126 may be programmed to store and update optimum engine performance parameters prior to the processor 124 carrying out the comparison.

In an operation 806, the engine parameter information received over the I/O interface 130 is compared to desired performance criteria for the engine 102. Thereafter, the processor 124 initiates a control routine to control the combustion control elements 106 using the ECM 104.

In an operation 808, the FPGA 122 is implemented. The FPGA 122 may be coupled to the processor 124. In one aspect, the processor 124 can program the FPGA 122 by outputting signals on one or more input terminals of the FPGA 122, e.g., on the external bus interface pin 504(9). In one aspect, the processor 124 may provide an enable signal to the FPGA 122 to output the one or more firing signals 600(1)-600(p), e.g., on the set of pins 504(12) of the FPGA 122. Based on the signals from the processor 124, the FPGA 122 outputs the firing signals 600(1)-600(p) to the plurality of driver banks 120. In one aspect, the FPGA 122 is configured to provide the plurality of firing signals 600(1)-600(p) simultaneously to the plurality of driver banks 120. For example, the FPGA 122 may provide the firing signals 600(1) and 600(2) simultaneously to the high side driver circuit 202(1) and 202(2), respectively. Likewise, more than two firing signals may be provided to the high side driver circuits 202(1)-202(p). As discussed, the firing signals 600(1)-600(p) may be distinct from each other and may at least partially overlap each other. In one aspect, only one of the firing signals out of the firing signals 600(1)-600(p) may be provided to one of the plurality of driver banks 120. The use of the FPGA 122 enables the machine 100 to control how and when combustion should occur in the engine 102 by controlling the firing signals 600(1)-600(p).

In an operation 810, the plurality of driver banks 120 are provided. In one aspect, providing the plurality of driver banks 120 includes activating one or more of the driver banks 120(1)-120(p) using the one or more firing signals 600(1)-600(p) from the FPGA 122. In one aspect, such firing signals 600(1)-600(p) from the FPGA 122 may be controlled by the processor 124 based upon the results of the comparison in the operation 804. Providing the plurality of driver banks 120 includes providing the at least two low side driver circuits 204(1) and 204(2) and the single high side driver circuit 202(1) in the driver bank 120(1). In one aspect, plural driver banks 120 each having a single high side driver circuit and at least two low side driver circuits may be arranged, for example, as illustrated in FIG. 2. For example, the driver banks 120(2)-120(p) may be provided. Further by example, twelve such driver banks 120(1)-120(12) may be provided with a total of twenty four low side driver circuits 204(1)-204(24) and twelve high side driver circuits 202(1)-202(12).

In an operation 812, the plurality of driver banks 120 output the plurality of output waveforms 700(1)-700(p) to the combustion control elements 106. In one aspect, the plurality of output waveforms 700(1)-700(p) may be provided to the plurality of combustion control elements 106 at any point over an engine crank angle of 0°-360°. The 360° injection window means that any of the combustion control elements 106 has 360° of crank angle to perform an operation (e.g., an injection). For example, for 4 stroke engines, 720° is considered a full cycle, so the remaining 360° is used by the other combustion control elements of the combustion control elements 106. The 360° window is obtained from being able to control at least 12 combustion control elements 106(1)-106(12) at a time. The plurality of output waveforms 700(1)-700(p) may be provided to fuel injectors and/or ignition coils to control combustion of fuel in the engine 102 in a fine tuned manner. In one aspect, the plurality of output waveforms 700(1)-700(p) may be output from two or more high side driver circuits 202(1) and 202(2) in a manner such that at least two of the plurality of output waveforms 700(1)-700(p) are different from each other. In one aspect, the plurality of output waveforms 700(1)-700(p) may be output from two or more high side driver circuits 202(1) and 202(2) in a manner such that at least two of the plurality of output waveforms 700(1)-700(p) overlap with each other. In one aspect, the plurality of output waveforms 700(1)-700(p) may be output from two or more high side driver circuits 202(1) and 202(2) in a manner such that at least two of the plurality of output waveforms 700(1)-700(p) are different from each other and at least partially overlap with each other.

In an operation 814, combustion of one or more fuels in one or more combustion chambers of the engine 102 is controlled in response to the activation of the combustion control elements 106 by one or more of the plurality of output waveforms 700(1)-700(p). In one aspect, when the engine 102 is a hybrid fuel engine, the plurality of output waveforms 700(1)-700(p) may differ from each other based upon different fuel mixture ratios. In one aspect, the plurality of output waveforms 700(1)-700(p) may differ from each other based upon varying loads and operating conditions for the engine 102.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An engine control module (ECM) comprising:
a plurality of driver banks configured to drive a plurality of combustion control elements, each of the plurality of driver banks including two low side driver circuits and a high side driver circuit, the high side driver circuit in each of the plurality of driver banks being shared pairwise by two combustion control elements in the plurality of combustion control elements, and each one of said at least two low side driver circuits being respectively associated with the two combustion control elements; and
a field programmable gate array (FPGA) coupled to the plurality of driver banks and configured to provide firing signals to at least twelve high side driver circuits to simultaneously drive at least twelve combustion control elements respectively coupled to the at least twelve high side driver circuits, said at least twelve combustion control elements being enabled by the respective low side driver circuits coupled to each of the at least twelve combustion control elements.

2. The engine control module of claim 1, wherein the FPGA is configured to provide the firing signals to simultaneously drive up to twenty four combustion control elements.

3. The engine control module of claim 1, wherein, for each driver bank, the high side driver circuit in the driver bank includes at least two field effect transistors (FETs), one of said at least two FETs providing a boost voltage source and the other of said two FETs providing a battery voltage source to at least one combustion control element coupled to an output of the high side driver circuit.

4. The engine control module of claim 3, wherein the high side driver circuit in the driver bank includes at least three FETs, a third FET being coupled to the other of said two FETs providing the battery voltage source, an output of said third FET being coupled to the output of the high side driver circuit.

5. The engine control module of claim 1, wherein the plurality of combustion control elements comprise at least one of the following: an injector and an ignition coil.

6. The engine control module of claim 1, wherein the firing signals provided by the FPGA are logic level signals.

7. The engine control module of claim 1, for each driver bank in the plurality of driver banks, the high side driver circuit includes an overcurrent protection circuit.

8. The engine control module of claim 1, wherein, an output of the high side driver circuit is configured to drive the two combustion control elements coupled to the high side driver circuit over an engine crank angle of 0°-360°.

9. The engine control module of claim 1, for each driver bank, wherein at least one of the low side driver circuits includes an overcurrent protection circuit.

10. A vehicle comprising the ECM of claim 1 and further comprising:
an engine; and
a plurality of combustion control elements.

11. A method for controlling fuel combustion in an engine using an engine controller module (ECM), the method comprising:
providing, in the ECM, a plurality of driver banks each including two low side driver circuits and a high side driver circuit, and each driver bank being coupled to two combustion control elements of the engine;
providing a field programmable gate array (FPGA) coupled to the plurality of driver banks; and
providing a plurality of firing signals simultaneously from the FPGA to at least twelve high side driver circuits to simultaneously drive twenty four combustion control elements respectively coupled to the at least twelve high side driver circuits to control fuel combustion in the engine, each said twenty four combustion control elements being enabled by the respective low side driver circuits coupled to each of the twenty four combustion control elements.

12. The method of claim 11 further comprising:
outputting an output signal from the high side driver circuit, said output signal having at least two levels to control the one or more combustion control elements, based upon the firing signals received from the FPGA.

13. The method of claim 11, wherein the firing signals are provided for controlling at least two field effect transistors (FETs) in the high side driver circuit, one of said at least two FETs providing a boost voltage source and the other of said two FETs providing a battery voltage source to at least one combustion control element coupled to an output of the high side driver circuit.

14. The method of claim 13, wherein the firing signals are provided for controlling at least three FETs, a third FET being coupled to the other of said two FETs providing the battery voltage source, an output of said third FET being coupled to the output of the high side driver circuit.

15. The method of claim 11 further comprising:
controlling the combustion control elements over an engine crank angle of 0°-360°.

16. The method of claim 11, wherein, the firing signals provided by the FPGA are logic level signals.

17. An engine control module (ECM) comprising:
a plurality of driver banks configured to drive a plurality of combustion control elements, each of the plurality of driver banks including two low side driver circuits and a high side driver circuit, the high side driver circuit in each of the plurality of driver banks being shared pairwise by two combustion control elements in the plurality of combustion control elements, and each one of said at least two low side driver circuits being respectively associated with the two combustion control elements; and
a programmable logic device (PLD) coupled to the plurality of driver banks and configured to provide firing signals to at least twelve high side driver circuits to simultaneously drive at least twelve combustion control elements respectively coupled to the at least twelve high side driver circuits, said at least twelve combustion control elements being enabled by the respective low side driver circuits coupled to each of the at least twelve combustion control elements, wherein the plurality of combustion control elements comprise at least one of the following: an injector and an ignition coil.

18. The engine control module of claim 17, wherein, for each driver bank, the high side driver circuit includes at least one input line coupled to the PLD and coupled to receive a firing signal from the PLD, and at least one output line configured to provide an output signal to the combustion control element coupled to the high side driver circuit in response to the firing signal.

19. The engine control module of claim 18, wherein, for each driver bank, the high side driver includes a boost voltage source and a battery voltage source, wherein the at least one output line is configured to provide the output signal including at least one of a boost voltage and a battery voltage outputted by the boost voltage source and the battery voltage source, respectively, to the combustion control element.

20. A vehicle comprising the ECM of claim 17 and further comprising:
   an engine; and
   a plurality of combustion control elements.

* * * * *